US010815401B2

(12) United States Patent
Nozawa et al.

(10) Patent No.: US 10,815,401 B2
(45) Date of Patent: Oct. 27, 2020

(54) BLOCK COPOLYMER COMPOSITION AND HOT MELT ADHESIVE COMPOSITION

(71) Applicant: ZEON CORPORATION, Chiyoda-ku, Tokyo (JP)

(72) Inventors: Atsushi Nozawa, Tokyo (JP); Sadaharu Hashimoto, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/761,233

(22) PCT Filed: Sep. 16, 2016

(86) PCT No.: PCT/JP2016/077411
§ 371 (c)(1),
(2) Date: Mar. 19, 2018

(87) PCT Pub. No.: WO2017/057049
PCT Pub. Date: Apr. 6, 2017

(65) Prior Publication Data
US 2018/0258328 A1  Sep. 13, 2018

(30) Foreign Application Priority Data

Sep. 30, 2015  (JP) ................. 2015-194871

(51) Int. Cl.
*C09J 153/02* (2006.01)
*C08L 53/02* (2006.01)
*C08L 101/12* (2006.01)
*C08F 297/04* (2006.01)

(52) U.S. Cl.
CPC ......... *C09J 153/02* (2013.01); *C08F 297/046* (2013.01); *C08L 53/02* (2013.01); *C08L 101/12* (2013.01); *C08L 2205/02* (2013.01)

(58) Field of Classification Search
CPC .... C08L 2205/03; C08L 53/02; C08L 101/12; C09J 153/02
See application file for complete search history.

(56) References Cited

U.S. PATENT DOCUMENTS

| | | | | |
|---|---|---|---|---|
| 3,956,223 A | * | 5/1976 | Chiang | C09J 153/02 524/482 |
| 4,792,584 A | * | 12/1988 | Shiraki | C09J 153/02 524/77 |
| 5,075,377 A | * | 12/1991 | Kawabuchi | C08G 81/022 525/89 |
| 5,736,612 A | | 4/1998 | Van Dongen et al. | |
| 6,291,583 B1 | * | 9/2001 | Komatsuzaki | C08F 297/046 525/314 |
| 6,534,593 B1 | * | 3/2003 | Komatsuzaki | C08F 297/04 525/89 |
| 2011/0257337 A1 | * | 10/2011 | Oda | C08L 53/02 525/98 |

FOREIGN PATENT DOCUMENTS

| | | |
|---|---|---|
| JP | S62257978 A | 11/1987 |
| JP | H0326747 A | 2/1991 |
| JP | H08505897 A | 6/1996 |
| JP | H08269148 A | 10/1996 |
| JP | H09500156 A | 1/1997 |
| JP | H10130349 A | 5/1998 |
| JP | 2002527568 A | 8/2002 |
| JP | 2003342441 A | 12/2003 |
| JP | 2004010719 A | 1/2004 |
| WO | 9417115 A1 | 8/1994 |
| WO | 9502640 A1 | 1/1995 |
| WO | 9958605 A1 | 11/1999 |
| WO | 0022062 A1 | 4/2000 |
| WO | 2010074267 A1 | 7/2010 |

OTHER PUBLICATIONS

Apr. 3, 2018, International Preliminary Report on Patentability issued in the International Patent Application No. PCT/JP2016/077411.
Dec. 13, 2016, International Search Report issued in the International Patent Application No. PCT/JP2016/077411.

* cited by examiner

*Primary Examiner* — Mark S Kaucher
(74) *Attorney, Agent, or Firm* — Kenja IP Law PC

(57) ABSTRACT

A main object of the present disclosure is to provide a block copolymer composition that allows a hot melt adhesive composition having excellent hot melt properties and heat resistance stability to be obtained. The object is achieved by providing a block copolymer composition comprising a block copolymer A including an $Ar^1$-$D^1$ diblock as a branched chain, the block copolymer A represented by the following general formula (I), characterized in that: a molecular weight distribution (Mw/Mn) of the block copolymer A is 1.20 or less; a content of the block copolymer A in the block copolymer composition is 10% by mass or more; a content of a block copolymer B corresponding to an $Ar^2$-$D^2$ diblock represented by the following general formula (II), in the block copolymer composition is 60% by mass or less, and a molecular weight distribution (Mw/Mn) of the block copolymer B is 1.15 or less; a content of an aromatic monovinyl monomer unit in the block copolymer composition is in a range of 12% by mass to 30% by mass; a weight average molecular weight (Mw) of the entire block copolymer composition is in a range of 300000 to 800000; and a melt index (G condition) of the entire block copolymer composition is in a range of 2 g/10 min to 20 g/10 min.

2 Claims, No Drawings

BLOCK COPOLYMER COMPOSITION AND HOT MELT ADHESIVE COMPOSITION

TECHNICAL FIELD

The present invention relates to a block copolymer composition that allows a hot melt adhesive composition having excellent hot melt properties and heat resistance stability to be obtained.

BACKGROUND ART

Hot melt adhesives are adhesives that are able to adhere to various products efficiently since they solidify in a short time, and are highly safe to human body since the adhesives do not require solvents. Therefore, hot melt adhesives are used in a variety of fields.

In regard to hot melt adhesives, it is known that various thermoplastic resins can be used as base polymers. For example, a styrene-isoprene block copolymer is known to be used as a base polymer.

Also, Patent Literature 1 describes that, although a hot melt adhesive is not mainly used, for the purpose of providing a pressure sensitive adhesive to be used in a production of materials such as a re-peelable tape that satisfies factors of tackiness, coherent strength, adhesiveness, and low peeling stress, a block copolymer including two or more kinds of diblocks as a branched chain, in each of which molecular amount is different, is used as a base polymer of the pressure sensitive adhesive.

CITATION LIST

Patent Literature

Patent Literature 1: Japanese Unexamined Patent Publication No. H08-505897

SUMMARY OF INVENTION

Technical Problem

Here, various properties are required for hot melt adhesives, and examples of the property may include hot melt properties that show intended fluidity when heated, and heat resistance stability that enables peeling without leaving paste even after being exposed under high temperature environment.

However, Patent Literature 1 does not describe the use of the block copolymer for the production of a hot melt adhesive having excellent hot melt properties and heat resistance stability.

Also, the hot melt adhesive composition in which the block copolymer described in Patent Literature 1 is used has a problem that the hot melt properties and heat resistance stability are insufficient.

The present invention is made in view of the above problems, and a main object of is to provide a block copolymer composition that allows a hot melt adhesive composition having excellent hot melt properties and heat resistance stability to be obtained.

Solution to Problem

The inventors of the present invention conducted a thorough investigation in order to achieve the object described above, and as a result, they found that, when a particular configuration in which, the molecular weight distribution and the content of the block copolymer having a branch structure that includes a diblock as a branched chain and of the block copolymer that is a linear diblock, as well as factors such as the content of the aromatic monovinyl monomer unit, weight average molecular weight, and melt index of the entire composition are in a specific range, is introduced, a block copolymer composition which can provide a hot melt adhesive composition having excellent in both hot melt properties and heat resistance stability, is obtained.

The present invention was completed based on this finding.

Thus, according to the present invention, there is provided a block copolymer composition comprising a block copolymer A including an $Ar^1$-$D^1$ diblock as a branched chain, the block copolymer A represented by the following general formula (I), characterized in that: a molecular weight distribution (Mw/Mn) of the block copolymer A is 1.20 or less; a content of the block copolymer A in the block copolymer composition is 10% by mass or more; a content of a block copolymer B corresponding to an $Ar^2$-$D^2$ diblock represented by the following general formula (II), in the block copolymer composition is 60% by mass or less, and a molecular weight distribution (Mw/Mn) of the block copolymer B is 1.15 or less; a content of an aromatic monovinyl monomer unit in the block copolymer composition is in a range of 12% by mass to 30% by mass; a weight average molecular weight (Mw) of the entire block copolymer composition is in a range of 300000 to 800000; and a melt index (G condition) of the entire block copolymer composition is in a range of 2 g/10 min to 20 g/10 min.

$$(Ar^1\text{-}D^1)_m X \tag{I}$$

$$Ar^2\text{-}D^2 \tag{II}$$

In the formula (I) and the formula (II), $Ar^1$ and $Ar^2$ each represents an aromatic monovinyl polymer block; $D^1$ and $D^2$ each represents a conjugated diene polymer block; m is an integer of 3 or more; and X is a residue of a multifunctional coupling agent.

In the block copolymer composition, the multifunctional coupling agent is preferably a compound including 2 or more of radical polymerizable groups in a molecular.

According to the present invention, there is provided a hot melt adhesive composition comprising: the above-described block copolymer composition of 100 parts by mass; a tackifying resin of 25 parts by mass to 400 parts by mass; a crosslinking agent of 0.01 parts by mass to 50 parts by mass; and a plasticizer of 0 part by mass to 200 parts by mass.

Advantageous Effects of Invention

The present invention exhibits an effect of providing a block copolymer composition that allows a hot melt adhesive composition having excellent hot melt properties and heat resistance stability to be obtained.

DESCRIPTION OF EMBODIMENTS

The present invention relates to a block copolymer composition and a hot melt adhesive composition.

The block copolymer composition and the hot melt adhesive composition of the present invention are hereinafter described in details.

A. Block Copolymer Composition

The block copolymer composition of the present invention is a block copolymer composition comprising a block copolymer A including an $Ar^1$-$D^1$ diblock as a branched chain, the block copolymer A represented by the following general formula (I), characterized in that: a molecular weight distribution (Mw/Mn) of the block copolymer A is 1.20 or less; a content of the block copolymer A in the block copolymer composition is 10% by mass or more; a content of a block copolymer B corresponding to an $Ar^2$-$D^2$ diblock represented by the following general formula (II), in the block copolymer composition is 60% by mass or less, and a molecular weight distribution (Mw/Mn) of the block copolymer B is 1.15 or less; a content of an aromatic monovinyl monomer unit in the block copolymer composition is in a range of 12% by mass to 30% by mass; a weight average molecular weight (Mw) of the entire block copolymer composition is in a range of 300000 to 800000; and a melt index (G condition) of the entire block copolymer composition is in a range of 2 g/10 min to 20 g/10 min.

$$(Ar^1\text{-}D^1)_m X \quad (I)$$

$$Ar^2\text{-}D^2 \quad (II)$$

In the above formula (I) and the formula (II), $Ar^1$ and $Ar^2$ each represents an aromatic monovinyl polymer block; $D^1$ and $D^2$ each represents a conjugated diene polymer block; m is an integer of 3 or more; and X is a residue of a multifunctional coupling agent.

According to the present invention, as the block copolymer A, the block copolymer composition includes the specific amount or more of a substance having three or more of $Ar^1$-$D^1$ diblocks as a branched chain, so as to improve fluidity upon heating and to provide a hot melt adhesive composition having excellent hot melt properties. Also, the block copolymer A includes three or more of $Ar^1$-$D^1$ diblocks as the branched chain, so as to allow a block copolymer to have higher molecular weight than that of the block copolymer B that is a linear diblock not coupled by a coupling agent. Also, the molecular weight distribution of the block copolymer A is 1.20 or less, which is narrow. Thereby, the block copolymer composition can provide a hot melt adhesive composition having excellent heat resistance stability.

The block copolymer composition of the present invention includes at least the block copolymer A.

The block copolymer composition of the present invention is hereinafter described in each constitution.

1. Block Copolymer A

The block copolymer A in the present invention is a block copolymer that is represented by the following general formula (I), includes an $Ar^1$-$D^1$ diblock as a branched chain, and has a structure in which, the $Ar^1$-$D^1$ diblock comprising an aromatic monovinyl polymer block $Ar^1$ and a conjugated diene polymer block $D^1$ is coupled by a multifunctional coupling agent.

$$(Ar^1\text{-}D^1)mX \quad (I)$$

In the formula (I), $Ar^1$ represents an aromatic monovinyl polymer block; $D^1$ represents a conjugated diene polymer block; m is an integer of 3 or more; and X is a residue of a multifunctional coupling agent.

(1) Aromatic Monovinyl Polymer Block $Ar^1$

The aromatic monovinyl polymer block $Ar^1$ in the block copolymer A is a polymer block containing an aromatic monovinyl monomer unit as a main constituent unit. The aromatic monovinyl monomer used to constitute the aromatic monovinyl monomer unit of the aromatic monovinyl polymer block $Ar^1$ is not particularly limited if it is an aromatic vinyl compound having one radical polymerizable group, and examples thereof may include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, and vinylnaphthalene. Among these, it is preferable to use styrene as the aromatic monovinyl monomer. These aromatic monovinyl monomers may be used each singly or in combination of two or more kinds thereof, in the aromatic monovinyl polymer block $Ar^1$.

The aromatic monovinyl polymer block $Ar^1$ in the block copolymer A may include a monomer unit other than the aromatic monovinyl monomer unit. Examples of the monomer that constitutes the monomer unit other than the aromatic monovinyl monomer unit that can be included in an aromatic monovinyl polymer block $Ar^1$ may include, conjugated diene monomers such as 1,3-butadiene and isoprene (2-methyl-1,3-butadiene); α,β-unsaturated nitrile monomers, unsaturated carboxylic acid or acid anhydride monomers, unsaturated carboxylic acid ester monomers, and non-conjugated diene monomers. The content of the monomer unit other than the aromatic monovinyl monomer unit in the aromatic monovinyl polymer block $Ar^1$ is preferably 20% by mass or less, more preferably 10% by mass or less, and particularly preferably substantially 0% by mass.

The weight average molecular weight of the aromatic monovinyl polymer block $Ar^1$ ($Mw(Ar^1)$) in the block copolymer A may be in a range of 7000 to 18000, is preferably in a range of 7500 to 17000, and more preferably in a range of 8000 to 16000. If the $Mw(Ar^1)$ is too small, there is a risk that the hot melt adhesive composition thus obtainable may have low holding power as an adhesive, and if it is too large, there is a risk that the melt viscosity of the hot melt adhesive composition may increase markedly.

Incidentally, in the present invention, the weight average molecular weight (Mw) and the number average molecular weight (Mn) of materials such as polymer blocks, diblocks, and block copolymer compositions are determined as a value measured by high performance liquid chromatography and calculated relative to polystyrene standards.

For the measurement of the weight average molecular weight and the number average molecular weight, in more particular, the values may be determined as a molecular weight calculated relative to polystyrene standards, by high performance liquid chromatography using tetrahydrofuran as a carrier at a flow rate of 0.35 ml/min. The measurement may be carried out by a device HLC8220™ manufactured by Tosoh Corporation, with three connected columns of SHODEX™ (registered trademark) KF-404HQ manufactured by SHOWA DENKO K.K (column temperature 40° C.), and a differential refractometer and an ultraviolet detector as detectors, and using twelve samples of polystyrene standards (from 500 to 3,000,000) manufactured by Polymer Laboratories Ltd. for the calibration of the molecular weight.

(2) Conjugated Diene Polymer Block $D^1$

The conjugated diene polymer block $D^1$ in the block copolymer A is a polymer block containing a conjugated diene monomer unit as a main constituent unit. The conjugated diene monomer used to constitute the conjugated diene monomer unit of the conjugated diene polymer block $D^1$ is not particularly limited if it is a conjugated diene compound, and examples thereof may include 1,3-butadiene, isoprene, 2,3-dimethyl-1,3-butadiene, 2-chloro-1,3-butadiene, 1,3-pentadiene, and 1,3-hexadiene. Among these, as the conjugated diene monomer, it is preferable to use 1,3-butadiene and/or isoprene, and it is particularly preferable to use isoprene. When the conjugated diene polymer block $D^1$ is formed from an isoprene unit, the hot melt adhesive composition thus obtainable acquires excellent adhesiveness and flexibility. These conjugated diene monomers can be respectively used singly or in combination of two or more kinds thereof in the conjugated diene polymer block $D^1$.

In addition, some of the unsaturated bonds of the conjugated diene polymer block $D^1$ may be subjected to a hydrogenation reaction.

The conjugated diene polymer block $D^1$ in the block copolymer A may include a monomer unit other than the conjugated diene monomer unit. Examples of the monomer that constitutes the monomer unit other than the conjugated diene monomer unit that can be included in the conjugated diene polymer block $D^1$ may include, aromatic vinyl monomers such as styrene and α-methylstyrene; α,β-unsaturated nitrile monomers, unsaturated carboxylic acid or acid anhydride monomers; unsaturated carboxylic acid ester monomers, and non-conjugated diene monomers. The content of the monomer unit other than the conjugated diene monomer unit in the conjugated diene polymer block $D^1$ is preferably 20% by mass or less, more preferably 10% by mass or less, and particularly preferably substantially 0% by mass.

The vinyl bond content of the conjugated diene polymer block $D^1$ in the block copolymer A (the content of 1,2-vinyl bonds and 3,4-vinyl bonds relative to all conjugated diene monomer units) is not particularly limited, but the vinyl bond content is usually in a range of 1% by mole to 20% by mole, preferably in a range of 1% by mole to 15% by mole, and more preferably in a range of 1% by mole to 10% by mole. If this vinyl bond content is too large, there is a risk that the hot melt adhesive composition thus obtainable may become too hard, and may have a lower adhesion level.

The weight average molecular weight of the conjugated diene polymer block $D^1$ ($Mw(D^1)$) in the block copolymer A is not particularly limited, but may be in a range of 20000 to 140000, is preferably in a range of 25000 to 120000, and more preferably in a range of 30000 to 100000. If the $Mw(D^1)$ is too small, there is a risk that the hot melt adhesive composition thus obtainable may have a low initial tack strength, and if $Mw(D^1)$ is too large, there is a risk that the hot melt adhesive composition may have a relatively high melt viscosity at a low temperature.

(3) $Ar^1$-$D^1$ Diblock

The $Ar^1$-$D^1$ diblock included in the block copolymer A as a branched chain may be produced using an arbitrary coupling agent, or may be produced without using a coupling agent. In other words, the $Ar^1$-$D^1$ diblock may contain a residue of a coupling agent within the various copolymer blocks or between the various copolymer blocks, and may not contain a residue of a coupling agent. However, from the viewpoint of making the hot melt adhesive composition using the block copolymer composition thus obtainable has excellent heat resistance and transparency, it is preferable that the $Ar^1$-$D^1$ diblock is produced without using a coupling agent, and does not contain a residue of a coupling agent within the various copolymer blocks and between the various copolymer blocks.

The weight average molecular weight ($Mw(Ar^1$-$D^1)$) and the molecular weight distribution ($Mw/Mn$) of the $Ar^1$-$D^1$ diblock included in the block copolymer A as a branched chain are not particularly limited, and, for example, may be the same weight average molecular weight and the molecular weight distribution of the block copolymer B, later described in the section "2. Block copolymer B".

The number of the $Ar^1$-$D^1$ diblock included in the block copolymer A as a branched chain, that is, the value of m showing the branched number of the block copolymer A is not particularly limited as long as it is 3 or more; the block copolymers A, in each of which different numbers of $Ar^1$-$D^1$ diblocks are connected, may be mixed. In the present invention, m is appropriately determined according to the factors such as the weight average molecular weight and the molecular weight distribution of the block copolymer A and the block copolymer composition, but is usually an integer in a range of 3 to 15, and preferably an integer in a range of 3 to 10. The reason therefor is that when a value of the m is in the range described above, the block copolymer composition can form a hot melt adhesive composition having excellent hot melt properties and heat resistance stability.

(4) Residue of Multifunctional Coupling Agent

The coupling agent that may form a residue of multifunctional coupling agent X in the block copolymer A is not limited as long as it bonds to the $Ar^1$-$D^1$ diblock and it can provide a block copolymer having three or more of the $Ar^1$-$D^1$ diblock as a branched chain.

Examples of the multifunctional coupling agent may include silane compounds of substances such as halogenated silanes such as tetrachlorosilane and tetrabromosilane, and alkoxysilane such as tetramethoxysilane and tetraethoxysilane; tin compounds of substances such as halogenated tin such as tetrachlorotin; epoxy compounds such as polycarboxylic acid ester and epoxidized soybean oil; and a compound having two or more of radical polymerizable groups in a molecule.

Also, examples of the compound having two or more of radical polymerizable groups in a molecule may include radical polymerizable aromatic compounds having two or more of a radical polymerizable group and an aromatic ring such as aromatic divinyl compounds such as divinylbenzene, divinyltoluene, divinylxylene, divinylanthracene, divinylnaphthalene, and divinyldurene; aromatic trivinyl compounds such as trivinylbenzene; and an aromatic tetravinyl benzene compound such as tetravinylbenzene; and radical polymerizeable aliphatic compounds having two or more of a radical polymerizable group and an aliphatic group such as pentaerythritol tetraacrylate.

In the present invention, the multifunctional coupling agent is preferably a compound having two or more of radical polymerizable groups in a molecule, and among them, a radical polymerizable aromatic compound is preferable, and in particular, an aromatic divinyl compound is preferable, and among them, divinylbenzene is particularly preferable. The reason therefor is that when the coupling agent is the above described compound, the block copolymer A having three or more of the $Ar^1$-$D^1$ diblock as a branched chain can be stably obtained.

(5) Block Copolymer A

The weight average molecular weight of the block copolymer A (MwA) may be in a range of 300000 to 800000, is preferably in a range of 330000 to 750000, and preferably in a range of 350000 to 700000. When the weight average molecular weight is in the range described above, the block copolymer composition can form a hot melt adhesive composition having excellent hot melt properties and heat resistance stability.

The molecular weight distribution (Mw/Mn) of the block copolymer A needs to be 1.20 or less, is preferably in a range of 1.00 to 1.18, and preferably in a range of 1.00 to 1.16. When the molecular weight distribution is in the range described above, the block copolymer composition can form a hot melt adhesive composition having excellent hot melt properties and heat resistance stability.

The aromatic monovinyl monomer unit content in the block copolymer A (content of the aromatic monovinyl monomer unit relative to all monomer units that constitute the block copolymer A) is not particularly limited, and for example, it may be the same as the "aromatic monovinyl monomer unit content in the block copolymer composition" described in the later described section "3. Block copolymer composition".

The content of the block copolymer A in the block copolymer composition needs to be 10% by mass or more, is preferably in a range of 30% by mass to 99% by mass, and preferably in a range of 60% by mass to 99% by mass. When the content is in the range described above, the block copolymer composition can form a hot melt adhesive composition having excellent hot melt properties and heat resistance stability.

Incidentally, the block copolymer A that constitutes the block copolymer composition of the present invention may be composed of only one kind of block copolymer A having a substantially single configuration, or may be composed of two or more kinds of block copolymer A having substantially different configurations.

2. Other Components

The block copolymer composition comprises at least the block copolymer A, but may include other copolymer component than the block copolymer A as far as it does not disturb the effect of the present invention.

Examples of such a copolymer component other than the block copolymer A may include the block copolymer B that is an $Ar^2$-$D^2$ diblock represented by the following general formula (II).

$$Ar^2\text{-}D^2 \tag{II}$$

In the formula (II), $Ar^2$ represents an aromatic monovinyl polymer block, and $D^2$ represents a conjugated diene polymer block.

The aromatic monovinyl polymer block $Ar^2$ and the conjugated diene polymer block $D^2$ constituting such a block copolymer B may be in the same contents as those of the aromatic monovinyl polymer block $Ar^1$ and the conjugated diene polymer block $D^1$ described in the section "1. Block copolymer A" above; thus, the descriptions herein are omitted.

Incidentally, for the aromatic monovinyl polymer block $Ar^2$, the conjugated diene polymer block $D^2$, and the $Ar^2$-$D^2$ diblock included in the block copolymer B, the same materials as the aromatic monovinyl polymer block $Ar^1$, the conjugated diene polymer block $D^2$, and the $Ar^1$-$D^2$ diblock included in the block copolymer A are usually used, but different materials therefrom may be used.

Incidentally, according to the later described method for producing the block copolymer composition of the present invention, the $Ar^2$, the $D^2$, and the $Ar^2$-$D^2$ diblock may be the same materials as the $Ar^1$, the $D^2$, and the $Ar^1$-$D^2$.

The $Ar^2$-$D^2$ diblock constituting the block copolymer B may be produced using an arbitrary coupling agent, and may be produced without using a coupling agent, but it is preferable that the $Ar^2$-$D^2$ diblock does not contain a residue of the coupling agent within the various copolymer blocks and between the various copolymer blocks.

The weight average molecular weight of the block copolymer B (MwB) may be in a range of 30000 to 150000, is preferably in a range of 35000 to 130000, and preferably in a range of 40000 to 110000. When the weight average molecular weight is in the range described above, the block copolymer composition can form a hot melt adhesive composition having excellent hot melt properties and heat resistance stability.

The molecular distribution (Mw/Mn) of the block copolymer B needs to be 1.15 or less, is preferably in a range of 1.00 to 1.13, and preferably in a range of 1.00 to 1.10. When the molecular distribution is in the range described above, the block copolymer composition can form a hot melt adhesive composition having excellent hot melt properties and heat resistance stability.

The aromatic monovinyl monomer unit content in the block copolymer B (content of the aromatic vinyl monomer unit relative to all monomer units that constitute the block copolymer B) is not particularly limited, and may be the same as the aromatic monovinyl monomer unit content in the block copolymer A described in the section "1. Block copolymer A" above.

The content of the block copolymer B in the block copolymer composition needs to be 60% by mass or less, is preferably in a range of 0% by mass to 40% by mass, and preferably in a range of 0% by mass to 20% by mass. When the content is in the range described above, the block copolymer composition can form a hot melt adhesive composition having excellent hot melt properties and heat resistance stability.

Incidentally, the block copolymer B that constitutes the block copolymer composition of the present invention may be composed of only one kind of block copolymer B having a substantially single configuration, or may be composed of two or more kinds of block copolymer B having substantially different configurations.

The block copolymer composition may be a composition that contains a block copolymer C represented by the following general formula (III) as a copolymer component other than the block copolymer A and the block copolymer B.

$$(Ar^3\text{-}D^3)_n X^3 \tag{III}$$

In the formula (III), $Ar^3$ and $D^3$ respectively represents an aromatic monovinyl polymer block and a conjugated diene polymer block, n is an integer of 1 to 2, and $X^3$ is a residue of a multifunctional coupling agent.

The aromatic monovinyl polymer block $Ar^3$, the conjugated diene polymer block $D^3$, and the residue of a multifunctional coupling agent $X^3$ constituting such a block copolymer C may be in the same contents as those of the aromatic monovinyl polymer block $Ar^1$, the conjugated diene polymer block $D^1$, and the residue of a multifunctional coupling agent X described in the section "1. Block copolymer A" above; thus, the descriptions herein are omitted.

Incidentally, for the aromatic monovinyl polymer block $Ar^3$, the conjugated diene polymer block $D^3$, the $Ar^3$-$D^3$ diblock, and the residue of a multifunctional coupling agent $X^3$ included in the block copolymer C, the same materials as the aromatic monovinyl polymer block $Ar^1$, the conjugated diene polymer block $D^1$, the $Ar^1$-$D^1$ diblock, and the residue of a multifunctional coupling agent X included in the block copolymer A are usually used, but different materials therefrom may be used.

The number of the $Ar^3$-$D^3$ diblock included in the block copolymer C, that is, the value of n showing the branched number of the block copolymer C is not particularly limited as long as it is an integer of 1 or 2; the block copolymers C, in each of which different numbers of $Ar^3$-$D^3$ diblocks are connected, may be mixed. In the present invention, n is appropriately determined according to the factors such as the weight average molecular weight and the molecular weight distribution of the block copolymer C and the block copolymer composition.

Incidentally, when n is 1, the block copolymer C has a linear structure of $Ar^3-D^3-X^3$.

The weight average molecular weight of the block copolymer C (MwC) may be in a range of 60000 to 300000, is preferably in a range of 70000 to 260000, and among them, is preferably in a range of 80000 to 220000. When the weight average molecular weight is in the range described above, the block copolymer composition can form a hot melt adhesive composition having excellent hot melt properties and heat resistance stability.

The molecular weight distribution (Mw/Mn) of the block copolymer C may be in a range of 1.00 to 1.13, and is preferably in a range of 1.00 to 1.10. When the molecular weight distribution is in the range described above, the block copolymer composition can form a hot melt adhesive composition having excellent hot melt properties and heat resistance stability.

The aromatic monovinyl monomer unit content in the block copolymer C (content of the aromatic vinyl monomer unit relative to all monomer units that constitute the block copolymer C) is not particularly limited, and may be the same as the aromatic monovinyl monomer unit content in the block copolymer A described in the section "1. Block copolymer A" above.

The content of the block copolymer C in the block copolymer composition may be in a range of 0% by mass to 50% by mass, and is preferably in a range of 0% by mass to 35% by mass. When the content is in the range described above, the block copolymer composition can form a hot melt adhesive composition having excellent hot melt properties and heat resistance stability.

Incidentally, the block copolymer C that constitutes the block copolymer composition of the present invention may be composed of only one kind of block copolymer C having a substantially single configuration, or may be composed of two or more kinds of block copolymer C having substantially different configurations.

3. Block Copolymer Composition

The block copolymer composition comprises at least the block copolymer A, and may include the block copolymer B and the block copolymer C as long as it does not disturb the effect of the present invention, and may further include a block copolymer D other than the block copolymers A to C.

Examples of such a block copolymer D may include a block copolymer having a structure different from that of the block copolymer A, such that the aromatic monovinyl monomer unit content is different from that of the block copolymer A, but is not limited thereto.

The content of the block copolymer D in the block copolymer composition is preferably 20% by mass or less, and more preferably 10% by mass or less. When the content is in the range described above, the block copolymer composition can form a hot melt adhesive composition having excellent hot melt properties and heat resistance stability.

The aromatic monovinyl monomer unit content in the block copolymer composition, that is, in the block copolymer composition of the present invention including the block copolymer A and optionally the block copolymers B to D, the content of the aromatic monovinyl monomer unit relative to the total amount of the said block copolymer, in other words, the content of the aromatic monovinyl monomer unit relative to the entire block copolymer components of the block copolymer composition (in the following descriptions, may be referred to as "overall content of aromatic monovinyl monomer units") needs to be in a range of 12% by mass to 30% by mass, is preferably in a range of 13.5% by mass to 28% by mass, and more preferably in a range of 15% by mass to 26% by mass. If the overall content of aromatic monovinyl monomer units is too small, the hot melt adhesive composition thus obtainable may have inferior holding power as an adhesive, and if the content is too large, the hot melt adhesive composition thus obtainable may become too hard, and may have an inferior adhesion level.

This overall content of the aromatic monovinyl monomer units can be easily adjusted by adjusting the amounts of incorporation of the various block copolymers while considering the contents of the aromatic monovinyl monomer units in the various block copolymers that constitute the block copolymer composition. Incidentally, in a case all of the polymer components that constitute the block copolymer composition are composed only of aromatic monovinyl monomer units and conjugated diene monomer units, when the block copolymers are subjected to ozone decomposition and then to reduction by lithium aluminum hydride according to the method described in Rubber Chem. Technol., 45, 1295 (1972), the conjugated diene monomer unit moieties are decomposed and only the aromatic monovinyl monomer unit moieties can be extracted. Therefore, the overall content of aromatic monovinyl monomer units can be measured easily.

The weight average molecular weight (Mw) of the overall block copolymer, that is the weight average molecular weight (Mw) of the overall block copolymer composition including the block copolymer A, and as optional components, block copolymer B, block copolymer C, and block copolymer D, needs to be in a range of 300000 to 800000, is preferably in a range of 320000 to 750000, and preferably in a range of 340000 to 700000. When the weight average molecular weight is in the range described above, the block copolymer composition can form a hot melt adhesive composition having excellent hot melt properties and heat resistance stability.

Also, the molecular weight distribution represented by the ratio (Mw/Mn) of this weight average molecular weight (Mw) and the number average molecular weight (Mn) of the overall block copolymer composition is not particularly limited, and is usually in a range of 1.01 to 2.50, preferably in a range of 1.02 to 2.20, and more preferably in a range of 1.03 to 2.0.

The melt index (G condition) of the entire block copolymer composition, as a value measured based on ASTM D1238 (G condition, 200° C., 5 kg), needs to be in a range of 2 g/10 min to 20 g/10 min, is preferably in a range of 4 g/10 min to 18 g/10 min, and preferably in a range of 6 g/10 min to 16 g/10 min. When the melt index is in the range described above, the block copolymer composition can form a hot melt adhesive composition having excellent hot melt properties and heat resistance stability.

The method for producing the block copolymer composition of the present invention is not particularly limited as long as the block copolymer composition comprising each of the components can be obtained thereby.

As such a production method, for example, a preferable method is to obtain a block copolymer A having three or more of the $Ar^1-D^1$ diblock as a branched chain by, first, preparing an $Ar^1-D^1$ diblock in which a conjugated diene polymer block $D^1$ having a polymerization active terminal is directly connected to an aromatic monovinyl polymer block $Ar^1$, and then coupling some of the $Ar^1-D^1$ diblock to form a block copolymer having three or more branches.

In other words, a preferable production method is a method comprising making an organic lithium initiator contact with an aromatic monovinyl monomer to produce an aromatic monovinyl polymer block $Ar^1$ having a polymerization active terminal, then adding a conjugated diene monomer thereto to produce an $Ar^1$-$D^1$ diblock in which a conjugated diene polymer block $D^1$ having a polymerization active terminal is directly connected to the aromatic monovinyl polymer block $Ar^1$, and then adding at least a multifunctional coupling agent thereto to change some of the $Ar^1$-$D^1$ diblock into the block copolymer A represented by the formula (I).

Next, the preferable method for producing the block copolymer composition of the present invention is described in each step, in further details.

(a) First, an aromatic monovinyl monomer is polymerized in a solvent using an organic lithium initiator. Regarding the organic lithium initiator, generally known initiators that can initiate the polymerization of an aromatic monovinyl monomer and a conjugated diene monomer may be used, and the specific examples thereof may include organic monolithium initiators such as methyllithium, n-propyllithium, n-butyllithium, and sec-butyllithium. Among them, n-butyllithium is preferable. The amount of use of the organic lithium initiator may be determined by calculation in accordance with the molecular weight of the desired polymer using a well-known method by one skilled in art.

The polymerization solvent is not particularly limited as long as it is inert to the organic lithium initiator, and for example, open chain hydrocarbon solvents, cyclic hydrocarbon solvents, or solvent mixtures thereof are used.

Examples of the open chain hydrocarbon solvent may include open chain alkanes and alkenes having 4 to 6 carbon atoms, such as n-butane, isobutane, n-hexane or the mixture thereof; 1-butene, isobutylene, trans-2-butene, cis-2-butene, or the mixture thereof; 1-pentene, trans-2-pentene, cis-2-pentene, or the mixture thereof; n-pentane, isopentane, neopentane, or the mixture thereof; and 1-pentene, trans-2-pentene, cis-2-pentene, or the mixture thereof.

Also, specific examples of the cyclic hydrocarbon solvent may include aromatic hydrocarbons such as benzene, toluene, and xylene; and alicyclic hydrocarbons such as cyclohexane.

From the points of controlling the polymerization temperature and controlling the molecular weight distribution of the aromatic monovinyl polymer block $Ar^1$ and the overall block copolymer composition, the mixture solvent of the open chain hydrocarbon solvent having 4 to 6 carbon atoms and the cyclic hydrocarbon solvent may be used preferably in a range of the mass ratio of 5:95 to 50:50, and more preferably in a range of the mass ratio of 10:90 to 40:60.

In the present invention, polymerization of the aromatic monovinyl monomer may be performed under the presence of a polar compound. By the use of a polar compound, the polymerization initiation speed can be adjusted, and also, the molecular weight distribution of the aromatic monovinyl polymer block $Ar^1$ can be adjusted. Regarding the polar compound, aromatic or aliphatic ethers or tertiary amines having a relative dielectric constant (25° C.) of 2.5 to 5.0 may be preferably used. Specific examples of such a polar compound may include aromatic ethers such as diphenyl ether and anisole; aliphatic ethers such as diethyl ether and dibutyl ether; and tertiary monoamines such as trimethylamine, triethylamine, and tripropylamine; and tertiary polyamines such as tetramethylethylenediamine, and tetraethylethylenediamine. These polar compounds are used singly or in combination of two or more kinds thereof. The amount of use of the polar compound is, per 1 mol of an organic lithium initiator, preferably in a range of 0.001 to 50 mol, and more preferably in a range of 0.005 to 10 mol.

There are no particular limitations on the method of polymerizing the aromatic monovinyl monomer, and any methods usually used may be used such as a batch polymerization in which the total amount of the aromatic monovinyl monomer and the total amount of the initiator are fed in an integral polymerization system to react with each other, a continuous polymerization in which the two are continuously supplied to a polymerization system to react with each other, and a method in which some of the monomer and the initiator are used to polymerize thereof to a specific conversion rate and then the rest of the monomer and the initiator are added to continue the polymerization. The polymerization is usually carried out at 0° C. to 90° C., and preferably in a range of 20° C. to 80° C. If the control of the reaction temperature is difficult, it is preferable to carry out the temperature control by reflux condensation using a reaction container in which a reflux condenser is placed.

(b) Next, a conjugated diene monomer is added to the polymerization system in which the aromatic monovinyl polymer block $Ar^1$ having a polymerization active terminal, produced as described above, is present, so as to polymerize thereof and produce the $Ar^1$-$D^1$ diblock in which the conjugated diene polymer block $D^1$ having a polymerization active terminal is connected to the aromatic monovinyl polymer block $Ar^1$. The conjugated diene monomer may be continuously added so as to control the reaction heat.

(c) After completing the polymerization reaction of the conjugated diene monomer, by adding a multifunctional coupling agent to the polymerization system, the $Ar^1$-$D^1$ diblock having the active terminal is connected thereto so as to produce the block copolymer A represented by the formula (I) including three or more of the $Ar^1$-$D^1$ diblock as the branched chain. Regarding the multifunctional coupling agent, the coupling agent described in the section "1. Block copolymer A" above may be used. On this occasion, a compound having a function to promote a coupling reaction may be added.

In the present invention, the amount of use of the coupling agent is important. The amount of use of the coupling agent varies with the kind of the coupling agent, and may be appropriately selected so that the number of the $Ar^1$-$D^1$ diblock as the branched chain in the block copolymer A becomes the specific number. The use of the amount may be selected in a range of, per 1 mol of an organic lithium initiator, usually 0.001 mol to 20 mol, preferably 0.01 mol to 10 mol, and more preferably 0.02 mol to 6 mol.

With the amount of use, the block copolymer A is produced in the block copolymer composition approximately in a range of 10% by mass to 99% by mass, preferably 30% by mass to 99% by mass, and more preferably in a range of 60% by mass to 99% by mass.

If the amount of use of the coupling agent is too little or too much, the block copolymer $(Ar^1$-$D^1)_2X$ having two branches (provided that $Ar^1$-$D^1$ and X are the same as the above) corresponding to the block copolymer C is easily produced in a large amount as the byproduct, and the block copolymer A including three or more of the $Ar^1$-$D^1$ diblock as the branched chain are rarely obtained.

The appropriate amount of use of the coupling agent may be determined by calculation according to the number of the branched chains in the objected block copolymer A and the like; however, since there are problems such as deactivation of the organic lithium initiator or the coupling agent in reality, it is better to determine an optimal value by conducting a preliminary experiment. As required, a reaction stopping agent such as methanol may be used to adjust the coupling rate.

(d) After completing the coupling reaction, a material such as water, alcohol, and acid is added as required to deactivate the polymerization activating species, followed by adding an antioxidant, then a polymer is separated by a generally known polymer separating method (such as steam stripping), and through the drying step, the block copolymer composition of the present invention, comprising at least the objected block copolymer A may be obtained.

Incidentally, in this case, the block copolymer composition usually becomes the composition that contains the block copolymer B which is a diblock component without the coupling reaction.

Incidentally, the block copolymer composition of the present invention may be integrally produced by the production method, but may be produced by such that the block copolymer A is prepared to optionally mix with the block copolymer B, block copolymer C, and D that are separately prepared.

B. Hot Melt Adhesive Composition

The hot melt adhesive composition of the present invention comprises the above described block copolymer composition of 100 parts by mass, a tackifying resin of 25 parts by mass to 400 parts by mass, a crosslinking agent of 0.01 parts by mass to 50 parts by mass, and a plasticizer of 0 part by mass to 200 parts by mass; it includes at least the above described block copolymer composition, tackifying resin and crosslinking agent, and further includes a plasticizer as required.

According to the present invention, the hot melt adhesive composition may have excellent hot melt properties and heat resistance stability by comprising the above described block copolymer composition.

The each component in the hot melt adhesive composition of the present invention is hereinafter described in details.

Incidentally, the block copolymer composition may be the same as described in the section "A. Block copolymer composition" above; thus, the description herein is omitted.

1. Tackifying Resin

Regarding the tackifying resin that is used in the present invention, a conventionally known tackifying resin can be used. Specific examples thereof may include rosin; modified rosins such as disproportionate rosin and dimerized rosin; esterification products between polyhydric alcohols such as glycol, glycerin and pentaerythritol, and rosin or modified rosins; terpene-based resins; aliphatic, aromatic, alicyclic, or aliphatic-aromatic copolymer-based hydrocarbon resins or hydrides thereof; phenolic resins; and coumarone-indene resins. A tackifying resin that is particularly preferably used is an aliphatic or aliphatic-aromatic copolymer-based hydrocarbon resin having favorable compatibility with the polymer components used in the present invention.

Incidentally, the tackifying resins may be used singly, or two or more kinds thereof may be used in combination.

The blending amount of the tackifying resin per 100 parts by mass of the block copolymer composition needs to be in a range of 25 parts by mass to 400 parts by mass, is preferably in a range of 50 parts by mass to 350 parts by mass, and more preferably in a range of 60 parts by mass to 300 parts by mass.

2. Crosslinking Agent

Regarding the crosslinking agent that is used in the present invention, all the crosslinking agents usually used in an adhesive composition can be used. Examples of the representative crosslinking system may include a peroxide crosslinking system, a sulfur crosslinking system, and a photo crosslinking system.

The peroxide crosslinking system includes a peroxide-based crosslinking agent. Examples of the peroxide-based crosslinking agent may include t-butyl hydroperoxide, cumene hydroperoxide, dicumyl peroxide, di-t-butyl peroxide, t-butyl cumyl peroxide, 2,5-dimetyl-t-butylperoxyhexane, 2,5-dimetyl-t-butylperoxyhexine, 1,3-bis(t-butylperoxyisopropyl)benzene, p-chlorobenzoyl peroxide, t-butyl peroxybenzoate, t-butyl peroxy isopropylcarbonate, and t-butyl benzoate. Also, in addition to these peroxide-based crosslinking agents, in the peroxide crosslinking system, generally as a vulcanizing agent, a multifunctional unsaturated compound such as trimetylolpropane trimethacrylate, divinylbenzene, ethylene dimethacrylate, polyethyleneglycol dimethacrylate, triallyl isocyanurate, tryallyl cyanurate, diallyl phthalate, diallyl itaconate, and triallyl trimellitate, is used in combination.

The sulfur crosslinking system includes a sulfur-based crosslinking agent. Examples of the sulfur-based crosslinking agent may include sulfur such as powder sulfur, flowers of sulfur, precipitated sulfur, colloidal sulfur, surface-treated sulfur, and insoluble sulfur; sulfur compounds such as sulfur chloride, sulfur dichloride, morpholine disulfide, alkyl phenol disulfide, N,N'-dithio-bis(hexahydro-2H-azepinon-2), phosphorus-containing polysulfide, and macromolecular polysulfide; and further, tetramethylthiuram disulfide, selenium dimethyldithiocarbamate, and 2-(4'-morpholinodithio) benzothiazole. Further, in the sulfur crosslinking system, in addition to these sulfur-based crosslinking agents, stearic acid; a sulfur vulcanization accelerator such as guanidine-based, aldehyde-amine-based, aldehyde-ammonia-based, thiazole-based, sulfenamide-based, tiourea-based, and zanthate-based sulfur vulcanization accelerator may be used in combination.

The photo crosslinking system may be an arbitrary single compound that produces a free radical initiating the polymerization of one or a plurality of monomer in response to an actinic ray without causing excessive stopping reaction, or a combination of compounds.

Any of the known kinds of the photo crosslinking system, particularly free radical photoinitiators such as quinones, benzophenones, benzoin ethers, aryl ketones, peroxides, biimidazoles, benzyl dimethyl ketal, hydroxyl alkyl phenyl acetophenone, dialkoxy acetophenone, trimethylbenzoyl phosphine oxide derivatives, aminoketones, benzoyl cyclohexanol, methyl thio phenyl morpholino ketones, morpholino phenyl amino ketones, alpha halogennoacetophenones, oxysulfonyl ketones, sulfonyl ketones, oxysulfonyl ketones, sulfonyl ketones, benzoyl oxime esters, thioxanthrones, camphorquinone, ketocoumarins, and Michler's ketone may be used. Alternatively, the photo crosslinking system may be a mixture of compounds in which one of the compounds provides the free radicals when caused to do so by a sensitizer activated by radiation.

The blending amount of the crosslinking agent per 100 parts by mass of the block copolymer composition needs to be in a range of 0.01 parts by mass to 50 parts by mass, is preferably in a range of 0.01 parts by mass to 20 parts by mass, and more preferably in a range of 0.01 parts by mass to 10 parts by mass.

3. Plasticizer

The plasticizer is not particularly limited, but an organic compound that is in a liquid form at a room temperature (23° C.) is favorably used. The kind of the plasticizer is not particularly limited as long as it exhibits compatibility with the block copolymer composition; in particular, process oil such as aromatic-based, paraffin-based, or naphtene-based process oil; and liquid polymer such as polybutene and polyisobutylene, which are added to a usual hot melt adhesive composition, may be used. Among them, paraffin-based process oil or naphtene-based process oil is particularly favorable. Incidentally, the plasticizer may be used singly or two or more kinds thereof may be used in combination.

The blending amount of the plasticizer per 100 pats by mass of the block copolymer composition needs to be in a range of 0 part by mass to 200 parts by mass, is preferably in a range of 1 part by mass to 150 parts by mass, and more preferably, the viscometric property is favorable and bleeding is small and suitable when it is in a range of 2 parts by mass to 100 parts by mass.

4. Hot Melt Adhesive Composition

The hot melt adhesive composition of the present invention may contain a polymer other than the essential components such as those described above. Examples of such a polymer include, but are not limited to, polymers having elasticity at a room temperature (23° C.) such as conjugated diene homopolymers such as polybutadiene and polyisoprene; aromatic vinyl-conjugated diene random copolymers such as a (styrene-butadiene) random copolymer and a (styrene-isoprene) random copolymer; aromatic vinyl homopolymers such as polystyrene; isobutyrene-based polymers, acrylic polymers, ester-based polymers, ether-based polymers, urethane-based polymers, and polyvinyl chloride. In the hot melt adhesive composition of the present invention, the blending amount of these polymers per 100 parts by mass of the block copolymer composition is preferably 20 parts by mass or less, and more preferably 10 parts by mass or less.

Furthermore, if necessary, an antioxidant can be added to the hot melt adhesive composition of the present invention. There are no particular limitations on the kind thereof, and examples that can be used include hindered phenolic compounds such as pentaerythritol tetrakis[3-(3,5-di-t-butyl-4-hydroxyphenyl) propionate], octadecyl-3-(3,5-di-t-butyl-4-hydroxyphenyl) propionate, 2,6-di-t-butyl-p-cresol, and di-t-butyl-4-methylphenol; thiodicarboxylate esters such as dilauryl thiopropionate; and phosphites such as tris(nonylphenyl) phosphite.

The blending amount of the antioxidant is not particularly limited, but per 100 parts by mass of the block copolymer composition, usually 10 parts by mass or less, and preferably 0.5 parts by mass to 5 parts by mass. Incidentally, the antioxidants may be used singly, or two or more kinds thereof may be used in combination.

Furthermore, in the hot melt adhesive composition of the present invention, other mixing agents such as a wax, a thermal stabilizer, an ultraviolet absorber, and a filler can be further added. Incidentally, the hot melt adhesive composition of the present invention is preferably a solventless composition that does not include any solvent.

On the occasion of obtaining the hot melt adhesive composition of the present invention, there are no particular limitations on the method of mixing the block copolymer composition with other components, and examples include a method of dissolving the respective components in a solvent, uniformly mixing the solutions, and removing the solvent by heating or the like, and a method of melt mixing the various components with a kneader or the like. From the viewpoint of performing mixing more efficiently, melt mixing is suitable among these methods. Incidentally, the temperature at the time of performing melt mixing is not particularly limited, but the temperature is usually in the range of 100° C. to 200° C.

The applications (object to be adhered) of the hot melt adhesive composition of the present invention is not particularly limited, and can be used for various adhesions to which hot melt adhesion is applicable; however, among them, the hot melt adhesive composition is particularly suitably used as an adhesive for so-called tapes that an adhesive composition is melt-coated with a film-shaped substrate. For example, the hot melt adhesive composition of the present invention is melted by heating, subsequently melt-coated on a substrate, and before the adhesive composition is completely solidified, an adherend comprising the same material as that constitutes the substrate or a different material therefrom may be pressed and adhered to the substrate.

Since the hot melt adhesive composition of the present invention has satisfactory hot melt properties, the hot melt adhesive composition contributes to a reduction of defective product ratio and to an increase in productivity in the production of such a tape. Furthermore, the tape thus obtainable has excellent heat resistance stability as an adhesive.

The hot melt adhesive composition of the present invention can be applied for products such as sanitary goods such as a disposable diaper and a sanitary napkin; packages for food such as frozen food, perishable foodstuff, and confectionery; packages for parts such as an automobile part and machine part; packages for electronic products such as a television, an audio product, and a refrigerator; use for bookbinding materials such as a slip, a book, and a catalogue; use for manufacturing bags such as a bag made of craft, a bag made of polypropylene, and a bag made of polyethylene; and clothing uses such as fastening the hems of coats, sticking leather and cloth, and adhering interlining cloth.

The present invention is not limited to the embodiments. The embodiments are exemplifications, and any other variations are intended to be included in the technical scope of the present invention if they have substantially the same constitution as the technical idea described in the claim of the present invention and offer similar operation and effect thereto.

EXAMPLES

Hereinafter, the present invention will be more specifically described by way of Examples and Comparative Examples. Incidentally, unless particularly stated otherwise, parts and percentage (%) in the various Examples are on a mass basis.

Various measurements were carried out by the following methods.

[Weight Average Molecular Weight and Molecular Weight Distribution]

The weight average molecular weight was determined as a molecular weight calculated relative to polystyrene standards, by high performance liquid chromatography using tetrahydrofuran as a carrier at a flow rate of 0.35 ml/min. The measurement was carried out using an HLC8220™ manufactured by Tosoh Corp. as an apparatus, with three connected columns of SHODEX™ KF-404HQ manufactured by Showa Denko K.K. (column temperature 40° C.), and a differential refractometer and an ultraviolet detector as detectors, and using twelve samples of polystyrene standards (from 500 to 3,000,000) manufactured by Polymer Laboratories, Ltd. for the calibration of the molecular weight.

[Content of Various Block Copolymers in Block Copolymer Composition]

The content was determined from the area ratio of peaks corresponding to the various block copolymers in the charts obtained by high performance liquid chromatography as described above.

[Styrene Unit Content of Block Copolymer Composition (Overall)]

The styrene unit content was determined based on a proton NMR analysis.

[Melt index of block copolymer composition] The melt index was measured in conformity to ASTM D1238 (G condition, 200° C., 5 kg).

Example 1

1. Production of Block Copolymer Composition

A pressure-resistant reactor of 50 litter was used wherein 18.75 kg of the mixture solvent of n-butane and cyclohexane in the ratio of 30:70, 50 millimole of dibutyl ether (relative permittivity 3.06/25° C.), and 110 millimole of an initiator n-butyllithium were present. First, 1.0 kg of styrene was added thereto and polymerized at 30° C. for 1 hour, and subsequently 7.0 kg of isoprene was added thereto and polymerized for approximately 1 and a half hours while the temperature was controlled to be maintained at 50° C. to 60° C. by reflux condensation. Next, a coupling reaction was carried out for 2 hours by adding divinylbenzene (DVB) as a coupling agent in an amount equivalent to 6 times of the initiator. Thereafter, 50 ml of methanol as a polymerization terminator, and 40 g of 2,6-di-tert-butyl-p-cresol as an antioxidant were added thereto and mixed well. The obtained mixture solution was dropped little by little into hot water heated to 85° C. to 95° C. and the solvent was volatilized. The obtained polymer was crushed and dried by hot air at 85° C. to obtain a block copolymer composition.

The styrene content of this block copolymer composition overall was 12.5% by mass, the weight average molecular weight (Mw) relative to polystyrene standards was 540,000, the melt index (G condition) was 19 g/10 min., the molecular weight distribution (Mw/Mn) of the block copolymer A was 1.11, the content of the block copolymer A in the block copolymer composition was 96% by mass, the molecular weight distribution (Mw/Mn) of the block copolymer B was 1.01, and the content of the block copolymer B in the block copolymer composition was 2% by mass.

The content of the 2-branched body included as the block copolymer C was 2% by mass in the block copolymer composition.

2. Production of Hot Melt Adhesive Composition

Introduced was 100 parts of the block copolymer composition into a stirring blade type kneading machine, and 100 parts of a tackifying resin (trade name "ARKON M-100"; alicyclic saturated hydrocarbon resin, manufactured by Arakawa Chemical Industries, Ltd.), 20 parts of a naphthene-based process oil (trade name "SHELL FLEX 371", manufactured by Shell Chemicals Japan Ltd.) as a plasticizer, 1 part of a crosslinking agent (trade name "IRGACURE 651", manufactured by BASF), and 1.5 parts of an antioxidant (trade name "IRGANOX 1010", manufactured by Ciba Specialty Chemicals, Inc.) were added thereto. The interior of the system was purged with nitrogen gas, and then the mixture was kneaded for 2 hours at 160° C. to 180° C. Thus, an adhesive composition was produced.

The hot melt adhesive composition produced in this manner was collected in 10 g, and the value of melt viscosity (unit: mPa·s) of the composition at 180° C. was measured by a thermo-cell-type Brookfield viscometer using a rotor No. 27. It was evaluated as "0" when the value of melt viscosity was 300000 mPa·s or less, and as "x" when the value was 300000 mPa·s or more.

[Cross-Linking of Hot Melt Adhesive Composition]

The hot melt adhesive composition was illuminated under a metal halide lamp in 1.0 J/cm², and subsequently the crosslinking of the adhesive composition was evaluated by a high speed liquid chromatography. In the obtained chart, it was evaluated as "0" when 20% or more of the block copolymer composition was polymerized by crosslinking and as "x" in the case of 20% or less. The results are presented in Table 1 below.

[Adhesive Residue of Hot Melt Adhesive Composition]

The hot melt adhesive composition was pressed and adhered to a polypropylene plate under the condition of 23° C. at the speed of 300 ram/min using a rubber roller of 2 kg, and after the adhesion, the product was kept at 100° C. for 24 hours and made to be a test sample. This test sample was peeled off at the peeling speed of 15 m/min using a high speed peeling tester "TE-701-S" manufactured by TESTER SANGYO CO., LTD. as a testing device, in the peeling adhesion strength (N/m) at 23° C. according to PSTC-1 (180° peeling adhesion test by US Pressure Sensitive Adhesive Tape Council). The polypropylene after peeling-off was visually observed and if the adhesive residue was visually recognized, the adhesive residue was evaluated as "present" and "x", and if the adhesive residue was not visually recognized, the adhesive residue was evaluated as "not present" and "0".

The results are presented in Table 1 below.

Examples 2 to 5

A block copolymer composition was respectively produced and the property thereof was evaluated in the same manner as in Example 1 except that the overall amount of styrene and isoprene were set to be the same, and the overall styrene content was set to be the amount presented in Table 1. Further, a hot melt adhesive composition was produced from each block copolymer composition and the property thereof was evaluated in the same manner as in Example 1. The results are presented in Table 1 below.

Comparative Example 1

A block copolymer composition was produced and the property thereof was evaluated in the same manner as in Example 1 except that the initiator n-butyllithium was set to be 80 millimole, the overall amount of styrene and isoprene were set to be the same, and the overall styrene content was set to be the amount presented in Table 2. Further, a hot melt adhesive composition was produced from each block copolymer composition in the same manner as in Example 1. However, the viscosity was too high to conduct the evaluations for the crosslinking and the adhesive residue test. The results are presented in Table 2 below.

Comparative Examples 2 and 3

A block copolymer composition was produced and the property thereof was evaluated in the same manner as in Example 1 except that the initiator n-butyllithium was set to be 150 millimole, the overall amount of styrene and isoprene were set to be the same, and the overall styrene content, and the kind and the adding amount of a coupling agent were set to be the amount presented in Table 2. Further, a hot melt adhesive composition was produced from each block copolymer composition and the property thereof was evaluated in the same manner as in Example 1. The results are presented in Table 2 below.

Comparative Example 4

A block copolymer composition was produced and the property thereof was evaluated in the same manner as in Example 1 except that, first, 0.5 kg of styrene was added to where 50 millimole of the initiator n-butyllithium was present, polymerized at 30° C. for 1 hour, and subsequently 60 millimole of the initiator n-butyllithium was added thereto, then 0.9 kg of styrene was added thereto to cause reaction at 30° C. for 1 hour, and subsequently 6.6 kg of isoprene was added thereto and polymerized for approximately 1 and a half hours while the temperature was controlled to be maintained at 50° C. to 60° C. by reflux condensation. Further, a hot melt adhesive composition was produced from the block copolymer composition in the same manner as in Example 1. The results are presented in Table 2 below.

TABLE 1

|  | Example 1 | Example 2 | Example 3 | Example 4 | Example 5 |
|---|---|---|---|---|---|
| Multibranched structure | Present | Present | Present | Present | Present |
| n-butyllithium (m mol) | 110 | 110 | 110 | 110 | 110 |
| Coupling agent |  |  |  |  |  |
| Kind | DVB | DVB | DVB | DVB | DVB |
| Adding amount (Coupling agent (mol)/Initiator (mol)) | 6 | 6 | 6 | 6 | 6 |
| Block copolymer A |  |  |  |  |  |
| Molecular weight distribution (Mw/Mn) | 1.11 | 1.10 | 1.10 | 1.11 | 1.10 |
| Content (%) | 96 | 95 | 94 | 90 | 94 |
| Block copolymer B |  |  |  |  |  |
| Molecular weight distribution (Mw/Mn) | 1.01 | 1.01 | 1.01 | 1.02 | 1.02 |
| Content (%) | 2 | 3 | 3 | 7 | 3 |
| Block copolymer C |  |  |  |  |  |
| Molecular weight distribution (Mw/Mn) | 1.01 | 1.01 | 1.01 | 1.02 | 1.02 |
| Content (%) | 2 | 2 | 3 | 3 | 3 |
| Block copolymer composition |  |  |  |  |  |
| Overall styrene content (%) | 12.5 | 14 | 16 | 18 | 25 |
| Weight average molecular weight (Mw) ((×10^3) g/mol) | 540 | 544 | 597 | 460 | 441 |
| Melt index (g/10 min) | 19 | 20 | 2.7 | 7.8 | 14.4 |
| Evaluation result |  |  |  |  |  |
| Production of adhesive by hot melt | ○ | ○ | ○ | ○ | ○ |
| Crosslinking (UV: 1.0 J/cm² Polymer production of 20% or more) | ○ | ○ | ○ | ○ | ○ |
| After keeping at high temperature (100° C., 24 h) Adhesive residue test upon peeling test | ○ | ○ | ○ | ○ | ○ |

TABLE 2

|  | Comparative Example 1 | Comparative Example 2 | Comparative Example 3 | Comparative Example 4 |
|---|---|---|---|---|
| Multibranched structure | Present | Present | Not present | Present |
| n-butyllithium (m mol) | 80 | 150 | 150 | First time: 50 Second time: 60 |
| Coupling agent |  |  |  |  |
| Kind | DVB | tetramethoxy silane | dimethyl dichlorosilane | DVB |
| Adding amount (Coupling agent (mol)/Initiator (mol)) | 6 | 0.25 | 0.16 | 6 |
| Block copolymer A |  |  |  |  |
| Molecular weight distribution (Mw/Mn) | 1.16 | 1.02 | — | 1.22 |
| Content (%) | 88 | 83 | — | 92 |
| Block copolymer B |  |  |  |  |
| Molecular weight distribution (Mw/Mn) | 1.10 | 1.01 | 1.01 | 1.18 |
| Content (%) | 7 | 12 | 67 | 4 |
| Block copolymer C |  |  |  |  |
| Molecular weight distribution (Mw/Mn) | 1.10 | 1.01 | 1.01 | 1.18 |
| Content (%) | 5 | 5 | 33 | 4 |

TABLE 2-continued

|  | Comparative Example 1 | Comparative Example 2 | Comparative Example 3 | Comparative Example 4 |
|---|---|---|---|---|
| Block copolymer composition | | | | |
| Overall styrene content (%) | 10.5 | 14.3 | 25 | 17 |
| Weight average molecular weight (Mw) ((×10^3) g/mol) | 957 | 242 | 124 | 450 |
| Melt index (g/10 min) | 0.1> | 9 | 20 | 25 |
| Evaluation result | | | | |
| Production of adhesive by hot melt | X | ○ | ○ | ○ |
| Crosslinking (UV: 1.0 J/cm² Polymer production of 20% or more) | — | X | X | ○ |
| After keeping at high temperature (100° C., 24 h) Adhesive residue test upon peeling test | — | X | X | X |

Followings can be seen from Table 1 and Table 2. That is, the hot melt adhesive composition comprising the block copolymer composition of the present invention (Examples 1 to 5) was evaluated as excellent in both the adhesive production evaluation by hot melt for evaluating the fluidity when heated, and the adhesive residue evaluation for evaluating the heat resistance stability. On the other hand, when the block copolymer compositions of Comparative Examples 1 to 4 were used, the hot melt adhesive compositions excellent in both hot melt properties and heat resistance stability could not be obtained.

The invention claimed is:

1. A block copolymer composition comprising a block copolymer A including an $Ar^1$-$D^1$ diblock as a branched chain, the block copolymer A represented by the following general formula (I), wherein:
   a molecular weight distribution (Mw/Mn) of the block copolymer A is 1.20 or less;
   a content of the block copolymer A in the block copolymer composition is 10% by mass or more;
   a content of a block copolymer B corresponding to an $Ar^2$-$D^2$ diblock represented by the following general formula (II), in the block copolymer composition is 60% by mass or less, and a molecular weight distribution (Mw/Mn) of the block copolymer B is 1.15 or less;
   a content of an aromatic monovinyl monomer unit in the block copolymer composition is in a range of 12% by mass to 30% by mass;
   a weight average molecular weight (Mw) of the entire block copolymer composition is in a range of 300000 to 800000; and
   a melt index (G condition) of the entire block copolymer composition is in a range of 2 g/10 min to 20 g/10 min:

$$(Ar^1\text{-}D^1)mx \quad (I)$$

$$Ar^2\text{-}D^2 \quad (II)$$

in the formula (I) and the formula (II), $Ar^1$ and $Ar^2$ each represents an aromatic monovinyl polymer block; $D^1$ and $D^2$ each represents a conjugated diene polymer block; m is in a range of 5.1 to 15; and X is a residue of a multifunctional coupling agent, wherein the polyfunctional coupling agent is a compound including 2 or more of radical polymerizable groups in a molecular.

2. A hot melt adhesive composition comprising:
   the block copolymer composition according to claim 1 of 100 parts by mass;
   a tackifying resin of 25 parts by mass to 400 parts by mass;
   a crosslinking agent of 0.01 parts by mass to 50 parts by mass; and
   a plasticizer of 0 part by mass to 200 parts by mass.

* * * * *